United States Patent
Davie

(10) Patent No.: US 7,197,545 B1
(45) Date of Patent: Mar. 27, 2007

(54) TECHNIQUES FOR DYNAMICALLY LOADING MODULES FOR DEVICES DISCOVERED IN A STORAGE NETWORK

(75) Inventor: Alan D. Davie, Fremont, CA (US)

(73) Assignee: SANavigator, Inc., Broomfield, CO (US)

(*) Notice: Subject to any disclaimer, the term of this patent is extended or adjusted under 35 U.S.C. 154(b) by 954 days.

(21) Appl. No.: 09/846,806

(22) Filed: Apr. 30, 2001

Related U.S. Application Data

(60) Provisional application No. 60/228,546, filed on Aug. 28, 2000.

(51) Int. Cl.
*G06F 15/177* (2006.01)

(52) U.S. Cl. .................................................. 709/220

(58) Field of Classification Search ................ 709/220, 709/221, 223, 224, 246
See application file for complete search history.

(56) References Cited

U.S. PATENT DOCUMENTS

| | | | |
|---|---|---|---|
| 5,748,612 A | 5/1998 | Stoevhase et al. | |
| 5,751,715 A | 5/1998 | Chan et al. | |
| 5,809,076 A * | 9/1998 | Hofmann | 375/257 |
| 5,894,481 A | 4/1999 | Book | |
| 5,978,379 A | 11/1999 | Chan et al. | |
| 6,014,715 A | 1/2000 | Stoevhase | |
| 6,092,096 A * | 7/2000 | Lewis | 709/200 |
| 6,151,643 A * | 11/2000 | Cheng et al. | 710/36 |
| 6,176,883 B1 * | 1/2001 | Holloway et al. | 709/223 |
| 6,385,197 B1 * | 5/2002 | Sugihara | 370/380 |
| 6,389,432 B1 * | 5/2002 | Pothapragada et al. | 707/205 |
| 6,397,385 B1 * | 5/2002 | Kravitz | 717/173 |
| 6,493,594 B1 * | 12/2002 | Kraml | 700/19 |
| 6,516,295 B1 * | 2/2003 | Mann et al. | 703/26 |
| 6,640,278 B1 * | 10/2003 | Nolan et al. | 711/6 |
| 6,697,875 B1 * | 2/2004 | Wilson | 709/245 |
| 6,735,766 B1 * | 5/2004 | Chamberlain et al. | 717/173 |
| 6,769,008 B1 * | 7/2004 | Kumar et al. | 709/201 |
| 6,772,204 B1 * | 8/2004 | Hansen | 709/220 |
| 6,775,814 B1 * | 8/2004 | Jue et al. | 716/18 |
| 6,862,613 B1 * | 3/2005 | Kumar et al. | 709/220 |
| 6,874,147 B1 * | 3/2005 | Diamant | 719/328 |
| 7,107,534 B1 * | 9/2006 | de Jong et al. | 715/734 |
| 2002/0062366 A1 * | 5/2002 | Roy et al. | 709/224 |
| 2002/0133573 A1 * | 9/2002 | Matsuda et al. | 709/220 |
| 2004/0199513 A1 * | 10/2004 | Dobberpuhl et al. | 707/9 |

* cited by examiner

*Primary Examiner*—David Wiley
*Assistant Examiner*—J. Bret Dennison
(74) *Attorney, Agent, or Firm*—Hensley Kim & Edgington, LLC

(57) ABSTRACT

Techniques for dynamically loading or changing code modules in applications for monitoring and/or managing SANs without having to restart the applications or power down the SANs. The code modules loaded by an application, while the application is executing, may be used by the application to perform a variety of SAN related functions including automated discovery and visualization, device management, performance and status monitoring, and other like functions.

46 Claims, 5 Drawing Sheets

TECHNIQUES FOR DYNAMICALLY LOADING MODULES FOR DEVICES DISCOVERED IN A STORAGE NETWORK

CROSS-REFERENCES TO RELATED APPLICATIONS

This application claims priority from U.S. Provisional Patent Application No. 60/228,546 entitled "STORAGE NETWORK CONTROL PROGRAM ARCHITECTURE FOR DYNAMIC INCORPORATION OF DEVICE DEPENDENT MODULES FOR DEVICES DISCOVERED DURING A NETWORK SCAN" filed Aug. 28, 2000, the entire disclosure of which is herein incorporated by reference for all purposes.

BACKGROUND OF THE INVENTION

The present invention relates to storage networks and more specifically to techniques for facilitating dynamic loading of code modules in storage network application programs.

Storage area networks (or SANs) provide a flexible and scalable infrastructure for data storage that is capable of delivering any-to-any connectivity between host systems and storage devices. SANs offer several benefits over traditional server-centric storage models including improved scalability of storage resources, availability, data protection, centralized storage management, improved data access speeds, and others. SANs allow enterprises to meet the constantly changing data storage requirements of today's large and rapidly growing networks, and help relieve storage-related bottlenecks typically associated with traditional server-centric storage techniques. As a result, SANs are increasingly replacing or supplementing traditional server-centric storage implementations.

The emergence of SANs has created the need for new storage management tools and applications which perform functions such as storage partitioning, storage provisioning, allocation of storage to hosts, data replications, backup services, monitoring status of SAN devices, and other functions. In order to be effective, these applications/tools need to facilitate additions, deletions, and changes to SAN components/devices without any downtime. These SAN applications also need to facilitate software and hardware updates in a seamless manner. The applications need to be easily configurable and provide the flexibility to support new devices or newly configured SAN devices.

In light of the above, there is a need for techniques which allow SAN-related applications to facilitate changes to the SAN without having to restart the application or without having to power down the SAN.

BRIEF SUMMARY OF THE INVENTION

The present invention describes techniques for dynamically loading code modules in applications for monitoring and/or managing SANs without having to restart the application or power down the SANs. The code modules loaded by an application, while the application is executing, may be used by the application to perform a variety of SAN related functions including automated discovery and visualization, device management, performance and status monitoring, and other like functions. Since these tasks can be performed without requiring down time of the application or of the SAN itself, techniques according to the present invention increase the efficiency, level of flexibility, and ease of use of SAN applications, in addition to other benefits.

According to an embodiment of the present invention, techniques are provided for dynamically loading code modules in an application program executing on a data processing system coupled to a SAN. Upon execution, the program is configured to access device information, which may be stored in one or more files. The device information may comprise information identifying a set of SAN device identifiers and a set of code modules associated with the set of SAN device identifiers. The application program may be configured to load the set of code modules referenced by the device information into an address space of the executing application program. The loaded code modules may then be used by the application program to perform SAN related functions. While the program is executing, a signal may be provided to the application program indicating that the device information has been modified. In response to the signal, the application program maybe configured to delete one or more code modules referenced by the device information before modification from the address space of the executing program, access the modified device information, and load the code modules referenced by the modified device information into the address space of the executing program. The code modules loaded in the address space of the application program may then be used to perform SAN related functions.

According to another embodiment of the present invention, an application program executing on a data processing system coupled to a SAN is configured to access device information wherein the device information includes information related to a set of SAN device identifiers and information identifying a set of code modules associated with the set of SAN device identifiers, the device information including information related to a first SAN device identifier and a first code module associated with the first SAN device identifier. The set of code modules identified in the device information are loaded into an address space of the executing program. The loaded set of code modules may be used to monitor devices coupled to the SAN whose device identifiers match identifiers in the set of SAN device identifiers. While the program is executing, a signal may be provided to the program indicating that the device information has been modified such that the information related to the first SAN device identifier has been removed/deleted from the device information. In response to the signal, the present invention is configured to delete the first code module associated with the first SAN device identifier from the address space of the executing program.

According to yet another embodiment of the present invention, an application program executing on a data processing system coupled to a SAN is configured to access information related to a first SAN device identifier wherein the accessed information includes information identifying a first code module associated with the first SAN device identifier. The embodiment of the present invention may load the first code module into an address space of the executing program. According to an embodiment of the present invention, the first code module may then be used to manage/monitor devices coupled to SAN whose device identifiers match the first SAN device identifier. While the program is executing, the program may receive a signal indicating that the information related to the first SAN device identifier has been modified, such that a second code module is associated with the first SAN device identifier instead of the first code module. In response to the signal, the present invention may delete the first code module associated with the first SAN device identifier from the address space of the executing program, and load the second code module into the address space of the executing program. According to an embodiment of the present invention, the second code module may then be used to manage/monitor devices coupled to SAN whose device identifiers match the first SAN device identifier.

According to an embodiment of the present invention, techniques are provided for dynamically loading code modules in an application program executing on a data processing system coupled to a SAN. In this embodiment, the program may be configured to access devices information comprising a set of SAN device identifiers including a first SAN device identifier, and information identifying code modules associated with SAN device identifiers in the set of SAN device identifiers. The devices information includes information identifying a first code module associated with the first SAN device identifier. The program may load the set of code modules associated with the set of SAN device identifiers, including the first code module, into an address space of the executing program. During execution of the program, the program may receive a signal indicating that the devices information has been modified such that the modified devices information includes a second SAN device identifier and a second code module associated with the second SAN device identifier, the second SAN device identifier not included in the set of SAN device identifiers included in the devices information before modification. In response to the signal, the program, according to an embodiment of the present invention, may load the second code module into the address space of the executing program. The second code module and the previously loaded code modules may then be used to monitor/manage devices coupled to the SAN.

According to yet another embodiment of the present invention, an application program executing on a data processing system coupled to a SAN is configured to access information related to a SAN device identifier, the information including information identifying a code module associated with the SAN device identifier. The program may load the code module into an address space of the executing program. While the program is executing, it may receive a signal indicating that the code module has been modified. In response to the signal, according to the teachings of the present invention, the program may delete the previously loaded code module from the address space of the executing program, and load the modified code module into the address space of the executing program. The modified code module, instead of the pre-modified code module, may then be used to monitor/manage SAN devices having device identifiers which match the SAN device identifier.

The foregoing, together with other features, embodiments, and advantages of the present invention, will become apparent when referring to the following specification, claims, and accompanying drawings.

DETAILED DESCRIPTION OF THE INVENTION

Figure 1:
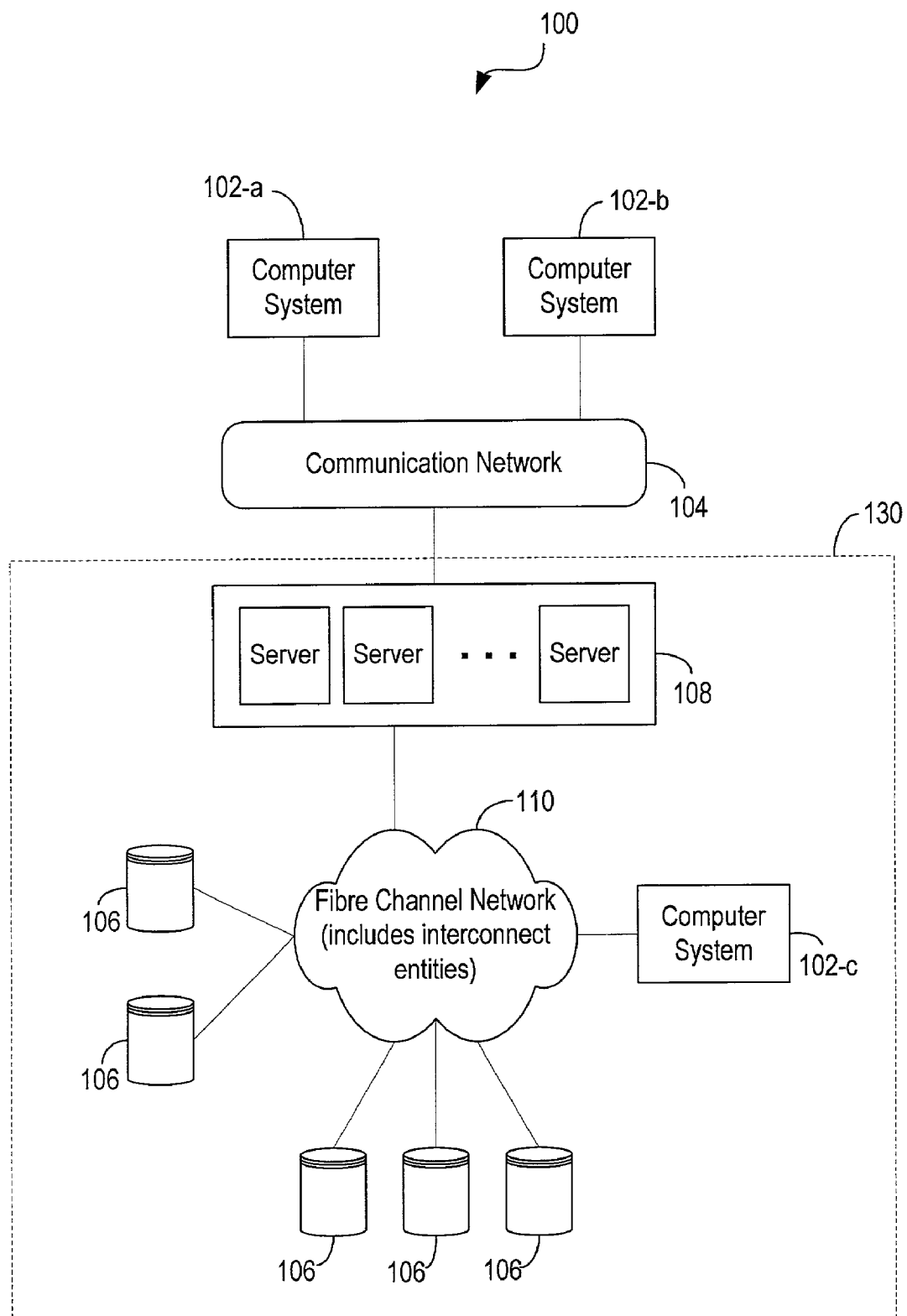
FIG. 1 is a simplified block diagram of a computer network which might incorporate an embodiment of the present invention.

The present invention provides techniques which enable applications executing on a computer system coupled to SANs to dynamically drop/load code modules. According to an embodiment of the present invention, the dynamic loading of modules can be performed without experiencing any down time for the application or without having to restart the application or without having to power down the SAN. FIG. 1 is a simplified block diagram of a computer network 100 which might incorporate an embodiment of the present invention. As depicted in FIG. 1, computer network 100 comprises a communication network 104, a SAN 130 which coupled to communication network 104, and one or more computers 102 which are coupled to communication network 104 or are part of the SAN itself. Distributed computer network 100 depicted in FIG. 1 is merely illustrative of an embodiment incorporating the present invention and does not limit the scope of the invention as recited in the claims. One of ordinary skill in the art would recognize other variations, modifications, and alternatives. For example, a plurality of SANs may be coupled to communication network 104.

Communication network 104 provides a mechanism for allowing communication and exchange of information between the various computer systems coupled to communication network 104 (e.g., computer systems 102-a, and 102-b) and SAN 130. Communication network 104 may itself be comprised of many interconnected computer systems and communication links. While in one embodiment, communication network 104 is the Internet, in other embodiments, communication network 104 may be any suitable communication network including a local area network (LAN), a wide area network (WAN), a wireless network, a intranet, private networks, public networks, switched networks, and the like.

Several different types of communication links may enable the connections between the various entities depicted in FIG. 1. The communication links may be hardwire links, optical links, satellite or other wireless communications links, wave propagation links, or any other mechanisms for communication of information. Various communication protocols may be used to facilitate communication between the various systems shown in FIG. 1. These communication protocols may include TCP/IP, HTTP protocols, extensible markup language (XML), wireless application protocol (WAP), IETF, vendor-specific protocols, customized protocols, Fibre Channel protocols, and others.

SAN 130 may comprise several heterogenous, multi-vendor components or devices such as switches, hubs, routers, storage subsystems, cables, connectors, computer systems, and the like. For purposes of this application, the word "device" is used interchangeably with the word "component". A SAN generally comprises of four classes of components or devices: (1) end-user platforms such as computer systems 102, thin clients, etc.; (2) server systems such as servers 108 depicted in FIG. 1; (3) storage devices and storage subsystems 106 which are used to store data/information; and (4) interconnect entities which provide interconnectivity between the various SAN components and with other devices/networks. Interconnections between the various SAN components may be provided by connectivity technologies such as LAN technologies, WAN technologies, Fibre Channel network technologies, and the like.

FIG. 1 depicts a SAN 130 based upon Fibre Channel technology (sometimes referred to as a "Fibre Channel SAN"). As shown in FIG. 1, Fibre Channel SAN 130 comprises a plurality of components such as storage devices or storage subsystems 106, server systems 108, and end-user platforms such as computer system 102-*c* coupled to a Fibre Channel network 110. The devices may be connected to Fibre Channel network 110 using Fibre Channel adapters. Storage devices 106 may include tapes, storage disks, optical storage devices, RAID devices, tape libraries, and other types of storage devices. Fibre Channel network 110 may itself be composed of various types of interconnect entities such as switches, hubs, routers, bridges, and the like. Fibre Channel network 110 provides an infrastructure for high performance, any-to-any interconnect for server-to-server or server-to-storage traffic. Fiber Channel allows multiple protocols for interconnecting the various components/devices over a single infrastructure. It should be apparent that SAN 130 depicted in FIG. 1 is merely illustrative of an embodiment incorporating the present invention and does not limit the scope of the invention as recited in the claims. One of ordinary skill in the art would recognize other variations, modifications, and alternatives.

Due to the complexity and heterogenous nature of a SAN, in order to be effective and useful, it is important that SAN applications be able to facilitate additions/removals of SAN devices, facilitate changes to SAN devices, handle updates to SAN-associated hardware, firmware, and software (e.g. support for new features devices, operating systems, and protocols) dynamically without having to power down the SAN or without having to restart the SAN application. According to the present invention, techniques are provided which use plug-in architecture models to facilitate addition/removal of SAN devices and facilitate changes to hardware/software related to the SAN in a dynamic manner. According to an embodiment of the present invention, techniques are provided for dynamically loading/dropping code modules associated with SAN devices/components while the SAN application program is executing on a computer system.

According to an embodiment of the present invention, the functions/tasks performed by the present invention may be implemented in software modules which may be executed by a data processing system such as computer system 102. The software modules implementing the features of the present invention may be incorporated into a SAN application program or alternatively may be used by SAN application programs. The software modules may also be implemented as a stand alone program offering services to other SAN application programs. The software modules may be executed by computer systems which are part of the SAN (e.g. computer system 102-*c* depicted in FIG. 1) or by computer systems which may be remotely coupled to the SAN (e.g. computer systems 102-*a* and 102-*b* which are coupled to SAN 130 via communication network 104).

Figure 2:
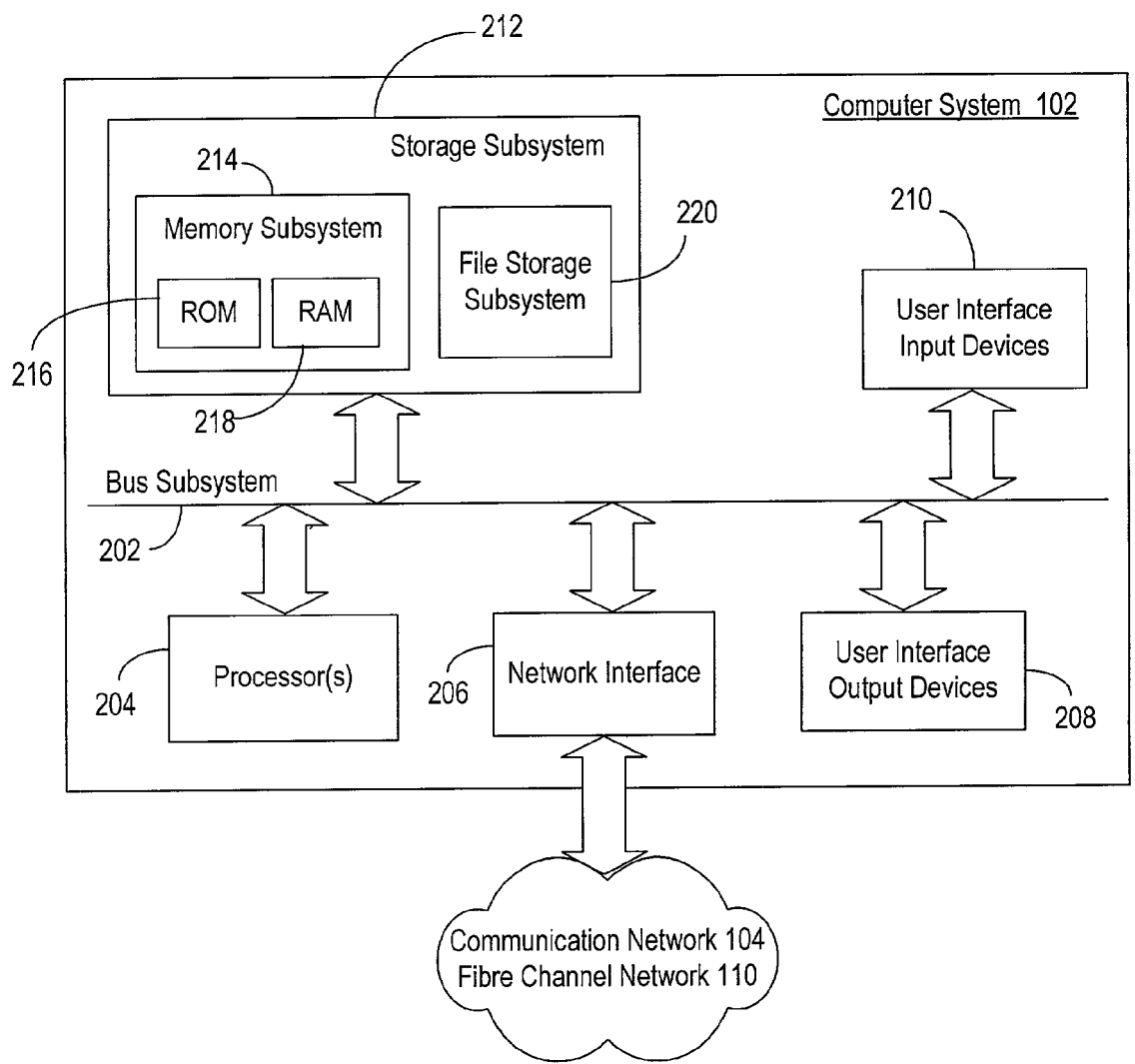
FIG. 2 is a simplified block diagram of a computer system according to an embodiment of the present invention.

FIG. 2 is a simplified block diagram of a computer system 102 according to an embodiment of the present invention. As shown in FIG. 2, computer system 102 may include at least one processor 204, which communicates with a number of peripheral devices via bus subsystem 202. These peripheral devices may include a storage subsystem 212, comprising a memory subsystem 214 and a file storage subsystem 220, user interface input devices 210, user interface output devices 208, and a network interface subsystem 206. The input and output devices allow user interaction with computer system 102. A user may be a human user (e.g., a SAN system administrator), a device, a process, another computer, and the like. Network interface subsystem 206 provides an interface to outside networks, including an interface to communication network 104 and/or Fibre Channel network 110, and may be coupled via the network to corresponding interface devices in other computer systems.

User interface input devices 210 may include a keyboard, pointing devices such as a mouse, trackball, touchpad, or graphics tablet, a scanner, a barcode scanner, a touchscreen incorporated into the display, audio input devices such as voice recognition systems, microphones, and other types of input devices. In general, use of the term "input device" is intended to include all possible types of devices and ways to input information into computer system 102 or to communication networks coupled to computer system 102.

User interface output devices 208 may include a display subsystem, a printer, a fax machine, or non-visual displays such as audio output devices. The display subsystem may be a cathode ray tube (CRT), a flat-panel device such as a liquid crystal display (LCD), or a projection device. The display subsystem may also provide non-visual display such as via audio output devices. In general, use of the term "output device" is intended to include all possible types of devices and ways to output information from computer system 102.

Storage subsystem 212 may be configured to store the basic programming and data constructs that provide the functionality of the computer system and of the present invention. For example, according to an embodiment of the present invention, software modules implementing the functionality of the present invention may be stored in storage subsystem 212. These software modules may be executed by processor(s) 204 of computer system 102. In a distributed environment, the software modules may be stored on a plurality of computer systems and executed by processors of the plurality of computer systems. Storage subsystem 212 may also provide a repository for storing various databases which may be used to store information according to the teachings of the present invention. Storage subsystem 212 may comprise memory subsystem 214 and file storage subsystem 220.

Memory subsystem 214 may include a number of memories including a main random access memory (RAM) 218 for storage of instructions and data during program execution and a read only memory (ROM) 216 in which fixed instructions are stored. File storage subsystem 220 provides persistent (non-volatile) storage for program and data files, and may include a hard disk drive, a floppy disk drive along with associated removable media, a Compact Digital Read Only Memory (CD-ROM) drive, an optical drive, removable media cartridges, and other like storage media. One or more of the drives may be located at remote locations on other connected computers at another site coupled to communication network 104 or Fibre Channel network 110. Information stored according to the teachings of the present invention may also be stored by file storage subsystem 220.

Bus subsystem 202 provides a mechanism for letting the various components and subsystems of computer system 102 communicate with each other as intended. The various subsystems and components of computer system 102 need not be at the same physical location but may be distributed at various locations within distributed network 100.

Although bus subsystem 202 is shown schematically as a single bus, alternative embodiments of the bus subsystem may utilize multiple busses.

Computer system 102 itself can be of varying types including a personal computer, a portable computer, a workstation, a computer terminal, a network computer, a mainframe, a kiosk, a PDA, a communication device such as a cell phone, or any other data processing system. Due to the ever-changing nature of computers and networks, the description of computer system 102 depicted in FIG. 2 is intended only as a specific example for purposes of illustrating the preferred embodiment of the computer system. Many other configurations of a computer system are possible having more or fewer components than the computer system depicted in FIG. 2.

Figure 3:
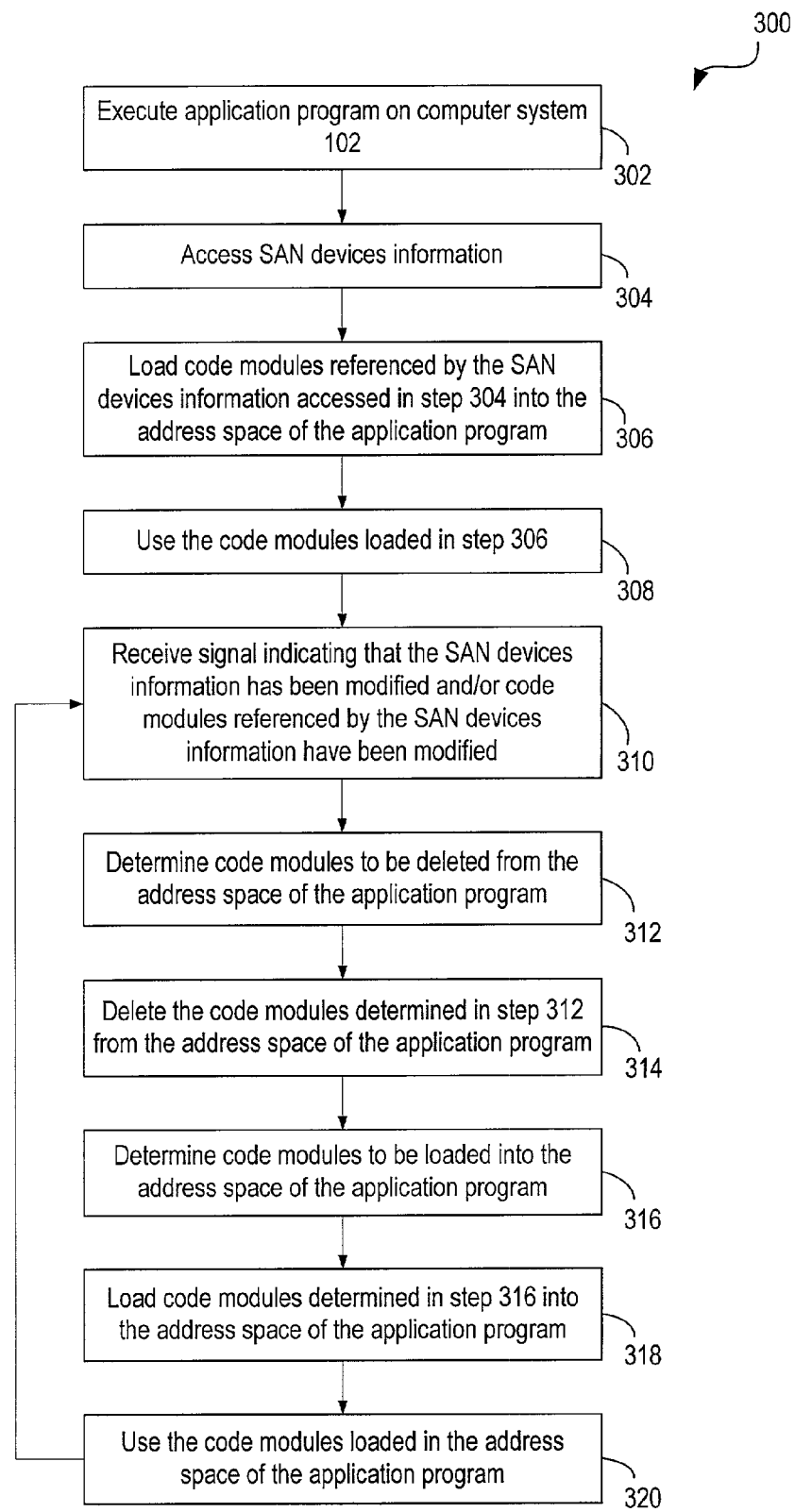
FIG. 3 is a simplified high-level flowchart depicting processing performed according to an embodiment of the present invention.

FIG. 3 is a simplified high-level flowchart 300 depicting processing performed according to an embodiment of the present invention. As described above, the software modules implementing the present invention may be incorporated into a SAN application program, or may be implemented as a stand alone program(s) offering services to other SAN application programs. Flowchart 300 and the related description describes an embodiment wherein the software modules are assumed to be incorporated into the SAN application. Accordingly, execution of the SAN application invokes services provided by the present invention.

As depicted in FIG. 3, a SAN application program (incorporating software modules implementing features of the present invention) may be executed on a computer system which may be either locally or remotely coupled to a SAN such as SAN 130 depicted in FIG. 1 (step 302). Examples of SAN application programs include a SAN management program, a program for visualizing the SAN layout, and the like.

Upon execution, the SAN application program may access and read information related to SAN devices supported by the SAN application program (step 304). Examples of SAN devices which may be supported by the application program may include various types of switches, hubs, routers, storage subsystems, cables, connectors, computer systems, and the like, manufactured by one or more vendors. According to an embodiment of the present invention, the SAN devices information accessed by the application program in step 304 contains information identifying one or more SAN devices supported by the application program. For each SAN device supported by the SAN application program, the SAN devices information may comprise information identifying a unique identifier associated with the SAN device and which uniquely identifies the SAN device. For example, if Simple Network Management Protocol (SNMP) protocol is used to perform SAN management, the unique identifiers may be "sysOIDs" (system object identifiers) used by the SNMP protocol to identify the SAN devices. It should be apparent that other techniques for identifying SAN devices may also be used within the scope of the present invention.

In addition to the unique identifiers, for each SAN device, the SAN devices information may also include information indicating the location, name, and/or version of one or more code modules associated with the particular SAN device. For example, for a particular SAN device, the SAN devices information may identify the pathname of a directory storing a code module associated with the particular SAN device and the name (e.g., filename) of the code module. A version of the code module may also be indicated. According to an embodiment of the present invention, Uniform Resource Locators (URLs) may be used to identify names of code modules associated with the SAN device and the locations from where the code modules may be accessed. The SAN devices information accessed in step 304 may also comprise other information related to the SAN devices, such as a textual description of the SAN devices, and the like. The term "code module" as used in this application is meant to refer to one or more software code modules, scripts, patches, programming data or any other data.

The SAN devices information may be stored in a file which may be accessed and read by the application program in step 304. Alternatively, the SAN devices information may be distributed across a plurality of files. According to an embodiment of the present invention, the SAN devices information is stored in a plurality of files with each file storing device information for a single SAN device. These files may be referred to as "property files" with each property file storing device information for a particular SAN device. The one or more files storing the SAN devices information may be stored either locally or remotely from the computer system executing the application program.

Referring back to FIG. 3, the application program may then load the code modules referenced by the SAN devices information (read in step 304) into the application space (or address space or virtual space) of the SAN application program (step 306). As discussed above, according to an embodiment of the present invention, the SAN devices information comprises URLs indicating the location and name of code modules associated with SAN devices supported by the application program. In this embodiment, the application program uses the URLs to access, read, and load code modules identified by the URLs. According to an embodiment of the present invention, a URL Class Loader may be used to load the code modules. A URL Class Loader takes a URL as an input parameter and loads the code module identified by the input parameter URL. It should be apparent that various other techniques known to those of ordinary skill in the art may also be used to load code modules in alternative embodiments of the present invention.

The code modules loaded in step 306 may then be used by the SAN application program to perform various SAN related functions and/or tasks (step 308). For example, the application program may use the code modules to monitor the SAN, to manage SAN devices coupled to the SAN, to perform configuration management on SAN devices, and to perform other like functions related to the SAN.

According to the teachings of the present invention, while executing on the computer system, the application program may receive a signal indicating that the SAN devices information has been modified or that one or more code modules referenced by the previously accessed SAN devices information have been modified (step 310). The SAN devices information is considered modified when information is added to or deleted from the SAN devices information, and/or when changes are made to the SAN devices information.

The SAN devices information may have been modified for various reasons. For example, the SAN devices information may have been modified to add support for one or more new SAN devices which have been added or will be added to the SAN. This may be accomplished by adding information related to new SAN device(s) to the SAN devices information. For example, in the embodiment of the present invention where the SAN devices information is stored in a plurality of files with each file (property file) storing device information for a particular SAN device, a SAN system administrator may modify the SAN devices information by adding a new property file containing information for each new device to be added to the SAN and to be supported by the application program.

The SAN devices information may also have been modified to remove/drop support for one or more SAN devices. This may be accomplished by removing or deleting device information corresponding to the "dropped" SAN devices from the SAN devices information. For example, in the embodiment of the present invention where SAN devices information is stored in a plurality of files with each file (property file) storing device information for a particular SAN device, a SAN system administrator may remove/drop support for one or more previously supported SAN devices by deleting property files corresponding to the SAN devices to be dropped.

The SAN devices information may also have been modified to modify/update the name and/or location of one or more code modules referenced by the SAN devices information. For example, if a new version of a code module is available for a particular SAN device, the code module name and location information associated with the particular SAN device in the SAN devices information may be changed to refer to the new version of the code module. The code module name and location information may also be modified to refer to another, possibly older, version of the code module (e.g. if the code module presently referenced by the SAN devices information was determined to contain excessive defects/bugs, the SAN devices information may be changed to point to another less buggy version of the code module). It should be apparent that the SAN devices information may also be modified/amended for various other reasons not described above.

According to an embodiment of the present invention, the signal received in step 310 may specifically identify the modifications made to the SAN devices information. For example, the signal may contain information specifically identifying the property files which have been added or deleted or modified. Alternatively, in a simplified embodiment of the present invention, the signal received in step 310 may only indicate that the SAN device information has been modified without identifying the specifics of the modifications.

The signal received in step 310 may also contain information indicating that one or more code modules referenced by the previously accessed SAN device information have been modified (In this scenario, the SAN devices information may not have been modified.). A code module may have been modified for a variety of reasons. For example, a code module may have been modified to correct bugs or defects in the code module. A code module may also have been modified to add new features or to enhance the functionality of the code module (e.g. to add new features/functionality to the SAN device associated with the code module). A code module may also be modified for several other reasons.

According to an embodiment of the present invention, the signal received in step 310 may specifically identify the one or more code modules which have been modified. The signal may also identify the property files which reference the modified code modules. Alternatively, in a simple embodiment of the present invention, the signal received in step 310 may only indicate that at least one code module has been modified without providing any additional information specific to the modification/change.

The SAN application program then determines which of the previously loaded code modules are to be deleted from the address space of the application program in response to the signal received in step 310 (step 312). According to an embodiment of the present invention, the code modules to be deleted include code modules which have been identified as having been modified and/or deleted, and code modules corresponding to property files which have been identified as having being modified and/or deleted. For example, if the signal indicates that a particular property file has been modified, the application program determines the one or more code modules corresponding to the modified property file and marks/tags those code modules for deletion from the address space of the application program. None of the previously loaded code modules may be marked for deletion if modification to the SAN devices information included only addition of new SAN devices (i.e. the signal received in step 310 indicates that the only change to the SAN devices information involved addition of one or more new property files corresponding to newly supported SAN devices). In embodiments or the present invention wherein the signal received in step 310 does not specifically identify the modified files or code modules, the application program may mark all the previously loaded code modules for deletion from the address space of the application program.

The SAN application program then deletes the code modules marked/tagged for deletion in step 312 from its address space (step 314).

The SAN application program then determines the code modules to be loaded into the address space of the application program in response to the signal received in step 310 (step 316). The application program determines which code modules are to be loaded based upon information included in the signal received in step 310. If the signal specifically identifies the code modules which have been modified, then those code modules are tagged to be loaded by the application program. If the signal identifies property files which have been modified or newly added, then code modules associated with those property files are marked for loading. In embodiments of the present invention where the signal received in step 310 does not specifically identify the code modules or the property files which have been modified, the application program may tag all the code modules referenced by the SAN devices information to be loaded.

The SAN application program then loads the code modules marked/tagged in step 316 into the address space of the application program (step 318). As described above in conjunction with step 306, various different techniques may be used to load the code modules into the address space of the application program. For example, in embodiments of the present invention where the SAN devices information comprises URL information, a URL Class Loader may be used to load the code modules identified by the URLs.

The SAN application program may then use the code modules loaded into the address space of the application program to perform various SAN related functions (step 320). The code modules loaded into the address space may include code modules loaded in step 318 in response to the signal received in step 310 and previously loaded codemodules, if any, which were not deleted in step 314. Processing may then proceed with step 310 whenever the application program receives another signal according to step 310.

As described above, steps 310, 312, 314, 316, 318, and 320 are performed while the application program is executing on a computer system without having to restart the application program or without having to power down the SAN. Accordingly, the present invention facilitates addition, deletion, and movement of SAN devices in the SAN addition of new features (e.g. addition of new discovery protocols, addition of features to the SAN devices, etc.), updates to software/hardware associated with the SAN devices, and other like functions in a dynamic manner without having to re-start the SAN application program or power down the SAN. This increases the efficiency, level of flexibility, and ease of use of SAN applications, in addition to other benefits.

As described above with respect to step 308 in FIG. 3, the code modules loaded into the address space of the application program may be used by the application program to perform a variety of SAN related functions. According to an embodiment of the present invention, the SAN application program may be a centralized storage resource management (SRM) application and may use the loaded code modules to manage the SAN and the storage related devices. Key SRM tasks include automated discovery and visualization, device management, performance and status monitoring, and other like tasks.

Figure 4:
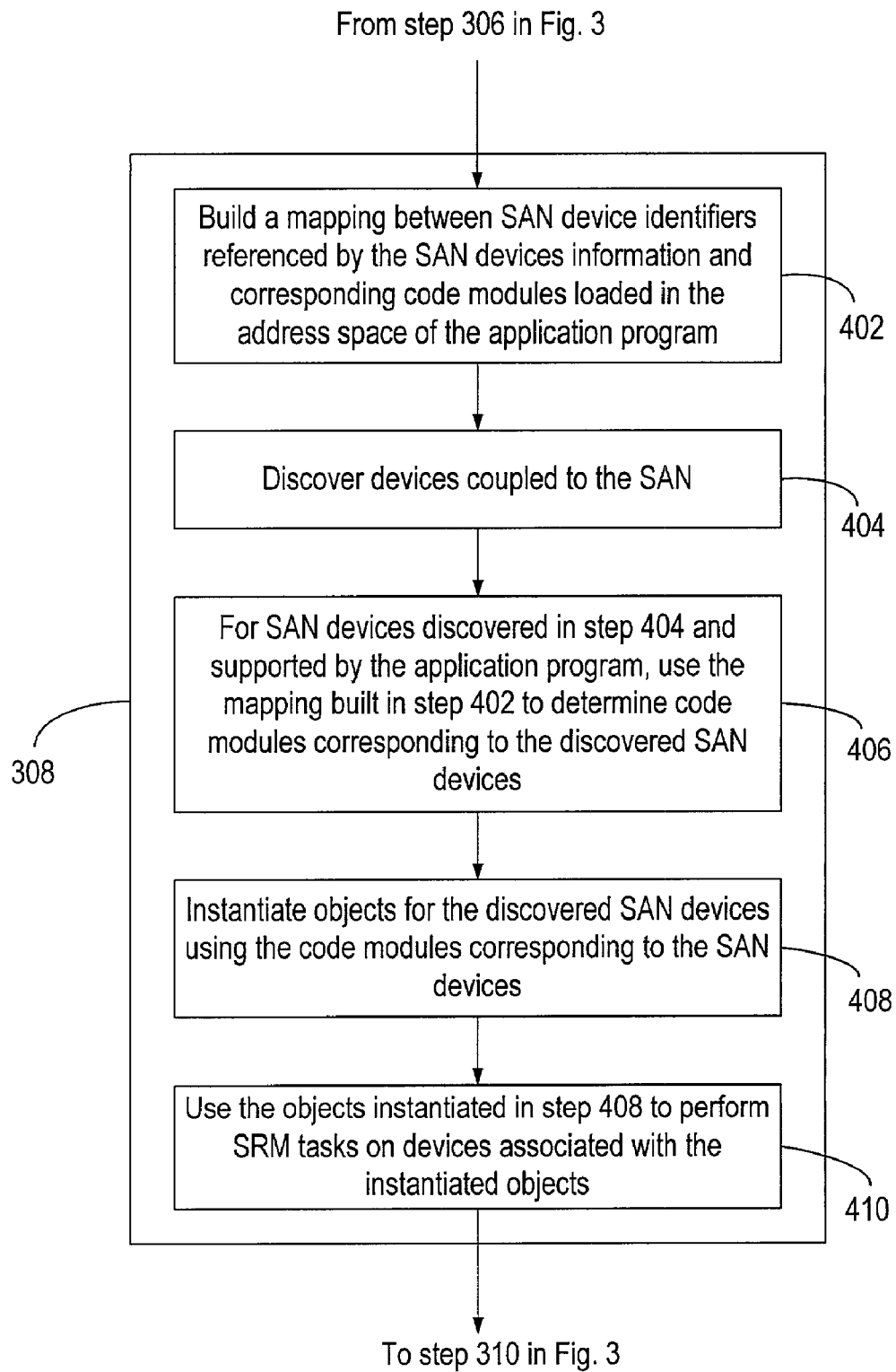
FIG. 4 is a simplified high-level flowchart depicting processing which may be performed in step 308 of FIG. 3 by an embodiment of the present invention to perform SRM related tasks.

FIG. 4 is a simplified high-level flowchart 400 depicting processing which may be performed in step 308 of FIG. 3 by an embodiment of the present invention to perform SRM related tasks. As depicted in FIG. 4, the SAN application program may build a mapping (e.g. a hash map) between the unique SAN device identifiers referenced by the SAN devices information accessed in step 304 and corresponding code modules loaded into the address space of the application program in step 306 (step 402). For example, in the embodiment of the present invention where SAN devices information is stored in a plurality of files with each file (property file) storing device information for a particular SAN device, for each property file, the application program may build a mapping between the unique SAN device identifier contained in the property file and the code module (or modules) referenced by the property file and which has been loaded into the address space of the application program. In a SNMP protocol environment, "sysOIDs" correspond to the unique SAN device identifiers, and the mapping maps each sysOID to its corresponding loaded code module.

The SAN application program may then discover devices coupled to the SAN (step 404). During the discovery step, the application program determines the physical layout of the SAN. This may include determining SAN devices coupled to the SAN either locally or remotely and the connections between the devices. Discovery may be performed using "out-of-band" communication techniques (e.g. SNMP over IP) or "in-band" methods" (e.g. directly over Fibre Channel). If an SNMP protocol is used, the SAN application program may query the devices for SNMP Management Information Base (MIB) data. The MIB data is then interpreted to find the information necessary to identify the topology of the SAN. Discovery of devices may be performed on a periodic basis.

As part of the discovery process according to step 404, for each discovered SAN device, the SAN application program determines a unique identifier associated with the SAN device and which uniquely identifies the SAN device. For example, the SNMP MIB data associates a "sysOID" with each device discovered as being coupled to the SAN.

For each device discovered in step 404, the application program determines if the discovered device is supported by the SAN application program (i.e. the application program determines if the unique device identifier associated with the discovered device is included in the mapping information generated in step 402), and if the discovered device is supported (i.e. the unique device identifier associated with the discovered device is included in the mapping information generated in step 402), the application program uses the mapping information to determine the code module (or modules) corresponding to the discovered device (step 406).

For example, in an environment using the SNMP protocol, the application program determines if the sysOID associated with a discovered device is included in the mapping information (e.g. a hash map) generated in step 402. If the sysOID is included in the hash map, the application program determines the code module which is mapped to the particular sysOID and associates that code module with the discovered device.

For each SAN device discovered in step 404 and which is supported by the application program, the application program may then instantiate one or more objects for the SAN device using the code module associated with the device in step 406 (step 408). The objects instantiated in step 408 may then be used to monitor and/or manage the SAN devices and to perform other SRM functions related to the SAN devices (step 410).

Figure 5:
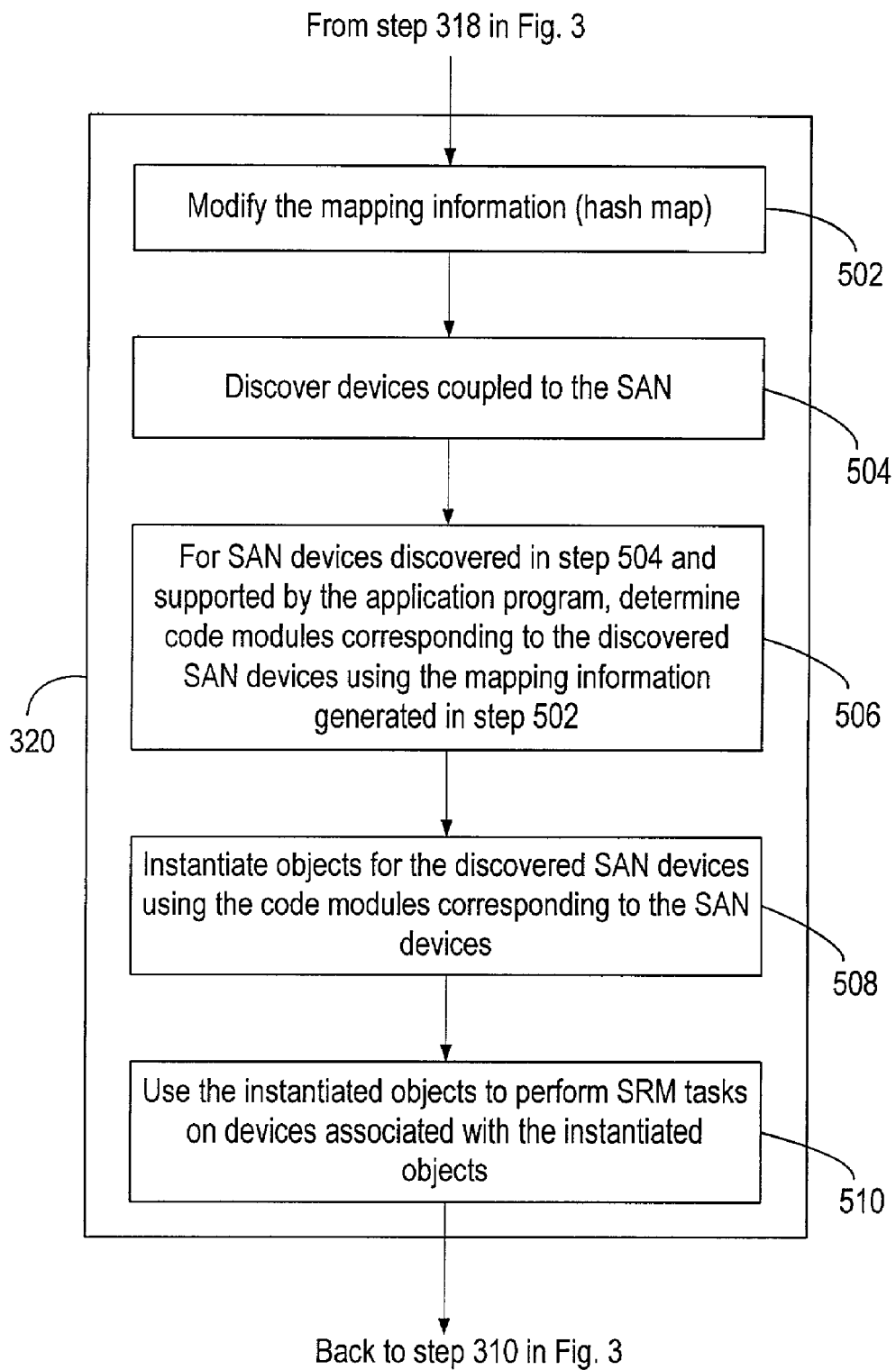
FIG. 5 is a simplified high-level flowchart depicting processing which may be performed in step 320 of FIG. 3 by an embodiment of the present invention to perform SRM related tasks.

FIG. 5 is a simplified high-level flowchart 500 depicting processing which may be performed in step 320 of FIG. 3 by an embodiment of the present invention to perform SRM related tasks. After the code modules have been loaded into the address space of the application program in step 318, the application program may update/modify the mapping information (e.g. the hash map) to reflect the new mappings between SAN device identifiers and code modules loaded into the address space of the application program. According to an embodiment of the present invention, the mapping information may be modified for only those code modules which have been loaded in step 318. In alternative embodiments of the present invention, the application program may delete the old/previous mapping information and generate new mapping information to reflect the updated/modified devices information.

The SAN application program may then discover the devices coupled to the SAN (step 504). As described above, during the discovery step, the application program may determine the physical layout of the SAN by determining SAN devices coupled to the SAN either locally or remotely and the connections between the devices.

For each device discovered in step 504, the application program then determines if the discovered device is supported by the application program (i.e. the application program determines if the unique device identifier associated with the discovered device is included in the mapping information generated/modified in step 502), and if the discovered device is supported (i.e. the unique device identifier associated with the discovered device is included in the mapping information generated/modified in step 502), the application program uses the mapping information to determine the code module (or modules) corresponding to the discovered device. For example, in an environment using the SNMP protocol, the application program determines if the sysOID associated with a discovered device is included in the mapping information generated/modified in step 502, and if the sysOID is included in the mapping information, the application program determines the code module which is mapped to the particular sysOID and associates that code module with the discovered device.

For each SAN device discovered in step 504 and which is supported by the application program, the application program instantiates one or more objects for the SAN device using the code module associated with the device in step 506 (step 508). The objects instantiated in step 508 may then be used to monitor and/or manage the SAN devices and to perform other SRM functions related to the SAN devices (step 510). In this manner code modules are dynamically loaded and used by the application program to perform SRM related tasks without having to restart the application program or without having to power down the SAN.

Although specific embodiments of the invention have been described, various modifications, alterations, alternative constructions, and equivalents are also encompassed within the scope of the invention. The described invention is not restricted to operation within certain specific data processing environments, but is free to operate within a plurality of data processing environments. Additionally, although the present invention has been described using a particular series of transactions and steps, it should be apparent to those skilled in the art that the scope of the present invention is not limited to the described series of transactions and steps.

Further, while the present invention has been described using a particular combination of hardware and software, it should be recognized that other combinations of hardware and software are also within the scope of the present invention. The present invention may be implemented only in hardware or only in software or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope of the invention as set forth in the claims.

What is claimed is:

1. In a network environment comprising a data processing system coupled to a storage area network (SAN), a method of dynamically loading code modules, the method comprising:
   executing a program on the data processing system, and upon execution:
      accessing device information, the device information comprising information identifying a set of SAN device identifiers and a first set of code modules associated with the set of SAN device identifiers;
      loading the first set of code modules referenced by the device information into an address space of the executing program;
   while executing the program:
      providing a signal to the executing program indicating that the device information has been modified to produce modified device information;
      in response to the signal:
         deleting the first set of code modules referenced by the device information before modification from the address space of the executing program;
         accessing the modified device information; and
         loading a second set of code modules referenced by the modified device information into the address space of the executing program.

2. The method of claim 1 wherein:
   the device information includes at least a first SAN device identifier associated with a first code module, and in the modified device information the first SAN device identifier is associated with a second code module instead of the first code module; and
   the operation of loading the second set of code modules referenced by the modified device information into the address space of the executing program comprises loading the second code module into the address space of the executing program.

3. The method of claim 2 further comprising:
   before receiving the signal:
      scanning the SAN to discover a set of SAN devices, the set of SAN devices including a first SAN device whose device identifier matches the first SAN device identifier; and
      using the first code module associated with the first SAN device identifier to monitor the first SAN device; and
   after loading the second set of code modules referenced by the modified device information into the address space of the executing program:
      using the second code module instead of the first code module to monitor the first SAN device.

4. The method of claim 1 wherein:
   the device information includes at least a first SAN device identifier associated with a first code module, and the modified device information includes information identifying a second SAN device identifier and a second code module associated with the second SAN device identifier, the second device identifier not included in the device information before modification; and
   loading the second set of code modules referenced by the modified device information into the address pace of the executing program comprises loading the second code module associated with the second SAN device identifier into the address space of the executing program.

5. The method of claim 4 further comprising:
   scanning the SAN to discover a first SAN device, the SAN device identifier associated with the first SAN device matching the second SAN device identifier; and
   using the second code module associated with the second SAN device identifier to monitor the first SAN device.

6. The method of claim 1 further comprising:
   before receiving the signal:
      scanning the SAN to discover a first set of SAN devices; and
      for each SAN device in the first set of SAN devices:
         if the identifier associated with the SAN device matches a SAN device identifier in the set of SAN device identifiers included in the device information, using the code module associated with the matching SAN device identifier to monitor the SAN device.

7. The method of claim 1 wherein the device information is stored in a plurality of files, each file including information related to a SAN device identifier from the set of SAN device identifiers and information related to a code module associated with the SAN device identifier.

8. In a network environment comprising a data processing system coupled to a storage area network (SAN), a method of loading code modules, the method comprising:
   executing a program on the data processing system;
   accessing device information, the device information including information related to a set of SAN device identifiers and information identifying a first set of code modules associated with the set of SAN device identifiers, the device information including information related to a first SAN device identifier and a first code module associated with the first SAN device identifier;
   loading the first set of code modules identified in the device information into an address space of the executing program;
   using the first set of code modules to monitor devices coupled to the SAN whose device identifiers match identifiers in the set of SAN device identifiers;
   while executing the program:

providing a signal to the executing program indicating that the device information has been modified, the modified device information not including information related to the first SAN device identifier; and in response to the signal:
  deleting the first code module associated with the first SAN device identifier from the address space of the executing program.

9. The method of claim 8 wherein:
the device information before modification is stored in a set of files, each file including information related to a SAN device identifier from the set of SAN device identifiers and information related to a code module associated with the SAN device identifier, the set of files including a first file including information related to the first SAN device identifier and information identifying the first code module associated with the first SAN device identifier; and
the modified device information is stored in a set of files not including the first file.

10. In a network environment comprising a data processing system coupled to a storage area network (SAN), a method of loading code modules, the method comprising:
executing a program on the data processing system;
accessing information related to a first SAN device identifier, the information related to the first SAN identifier including information identifying a first code module associated with the first SAN device identifier;
loading the first code module into an address space of the executing program;
while executing the program:
  receiving a signal indicating that the information related to the first SAN device identifier has been modified, the modified information identifying a second code module associated with the first SAN device identifier instead of the first code module;
in response to the signal:
  deleting the first code module associated with the first SAN device identifier from the address space of the executing program; and
  loading the second code module into the address space of the executing program.

11. The method of claim 10 further comprising:
before receiving the signal:
  scanning the SAN to identify at least a first device coupled to the SAN;
  determining an identifier associated with the first device; and
  if the identifier associated with the first device matches the first SAN device identifier, using the first code module loaded into the address space of the program to monitor the first device; and
after loading the second code module:
  if the identifier associated with the first device matches the first SAN device identifier, using the second code module loaded into the address space of the program module to monitor the first device.

12. The method of claim 11 wherein using the second code module loaded into the address space of the program to monitor the first device comprises:
instantiating an object using the second code module;
associating the object with the first device; and
using the object to monitor the first device.

13. The method of claim 11 wherein determining the identifier associated with the first device comprises using SNMP protocol to determine the identifier.

14. In a network environment comprising a data processing system coupled to a storage area network (SAN), a method of loading code modules, the method comprising:
executing a program on the data processing system;
accessing device information comprising a set of SAN device identifiers including a first SAN device identifier, the device information further comprising information identifying a first code modules associated with SAN device identifiers in the set of SAN device identifiers including information identifying a first code module associated with the first SAN device identifier;
loading the first set of code modules associated with the set of SAN device identifiers including the first code module into an address space of the executing program;
while executing the program:
  receiving a signal indicating that the device information has been modified, the modified device information including a second SAN device identifier and a second code module associated with the second SAN device identifier, the second SAN device identifier not included in the set of SAN device identifiers included in the device information before modification;
in response to the signal:
  loading the second code module into the address space of the executing program.

15. The method of claim 14 further comprising:
scanning the SAN to identify a set of devices coupled to the SAN;
for each device in the set of devices:
  determining an identifier associated with a device in the set of devices;
  if the identifier associated with the device matches the first SAN device identifier, using the first code module loaded into the address space of the program to monitor the device; and
  if the identifier associated with the device matches the second SAN device identifier, using the second code module loaded into the address space of the program to monitor the device.

16. The method of claim 15 wherein using the second code module loaded into the address space of the program to monitor the device comprises:
instantiating an object using the second code module;
associating the object with the device whose identifier matches the second SAN device identifier; and
using the object to monitor the device.

17. The method of claim 15 wherein determining the identifier associated with the device comprises using SNMP protocol to determine the identifier.

18. The method of claim 14 wherein the device information is stored in a plurality of files, each file including information related to a SAN device identifier from the set of SAN device identifiers and information related to a code module from the first set of code modules associated with the SAN device identifier.

19. In a network environment comprising a data processing system coupled to a storage area network (SAN), a method of loading code modules, the method comprising:
executing a program on the data processing system;
accessing information related to a SAN device identifier, the information related to the SAN identifier including information identifying a code module associated with the SAN device identifier;
loading the code module into an address space of the executing program;
while executing the program:

receiving a signal indicating that the code module has been modified;
in response to the signal:
deleting the previously loaded code module from the address space of the executing program; and
loading the modified code module into the address space of the executing program.

20. A computer program product stored on a computer-readable medium for dynamically loading code modules, the computer program product comprising:
code for accessing device information, the device information comprising Information identifying a set of SAN device identifiers and a first set of code modules associated with the set of SAN device identifiers; and
code for loading the first set of code modules referenced by the device information into an address space of an executing application program;
code for using the first set of code modules referenced by the device information and loaded into the address space of the executing application program to manage a storage area network (SAN);
code for receiving a signal while the application program is executing, the signal indicating that the device information has been modified to produce modified device information;
code for deleting the first set of code modules referenced by the device information before modification from the address space of the executing application program in response to the signal;
code for accessing the modified device information;
code for loading a second of code modules referenced by the modified device information into the address space of the executing application program; and
code for using the second set of code modules referenced by the modified device information and loaded into the address space of the executing application program to manage the SAN.

21. The computer program product of claim 20 wherein:
the device information includes at least a first SAN device identifier associated with a first code module, and in the modified device information the first SAN device identifier is associated with a second code module instead of the first code module; and
the code for loading the second set of code modules referenced by the modified device information into the address space of the executing application program comprises code for loading the second code module into the address space of the executing application program.

22. The computer program product of claim 20 wherein:
the code for using the first set of code modules referenced by the device information and loaded into the address space of the executing application program to manage the SAN comprises:
code for scanning the SAN to discover a set of SAN devices, the set of SAN devices including a first SAN device whose device identifier matches the first SAN device identifier; and
code for using the first code module associated with the first SAN device identifier to manage the first SAN device; and
the code for using the second set of code modules referenced by the modified device information and loaded into the address space of the executing application program to manage the SAN comprise:
code for using the second code module instead of the first code module to manage the first SAN device.

23. The computer program product of claim 20 wherein:
the device information includes at least a first SAN device identifier associated with a first code module, and the modified device information includes information identifying a second SAN device identifier and a code module associated with the second SAN device identifier, the second device identifier not included in the device information before modification;
the code for using the first set of code modules referenced by the device information and loaded into the address space of the executing application program to manage the SAN comprises:
code for scanning the SAN to discover a first set of SAN devices; and
for each SAN device in the first set of SAN devices, if the identifier associated with the SAN device matches a SAN device identifier in the set of SAN device identifiers included in the device information, code for using the code module associated with the matching SAN device identifier to monitor the SAN device;
the code for loading the second set of code modules referenced by the modified device information into the address space of the executing application program comprises code for loading the code module associated with the second SAN device identifier into the address space of the executing application program; and
the code for using the second set of code modules referenced by the modified device information and loaded into the address space of the application program to manage the SAN comprises:
code for scanning the SAN to discover a first SAN device, the SAN device identifier associated with the first SAN device matching the second SAN device identifier; and
code for using the code module associated with the second SAN device identifier to monitor the first SAN device.

24. A computer program product stored on a computer readable medium for dynamically loading code modules, the computer program product comprising:
code for accessing device information, the device information including information related to a set of SAN device identifiers and information identifying a first set of code modules associated with the set of SAN device identifiers, the device information including information related to a first SAN device identifier and a first code module associated with the first SAN device identifier;
code for loading the first set of code modules identified in the device information into an address space of an executing application program;
code for using the first set of code modules to manage devices coupled to the SAN whose device identifiers match identifiers in the set of SAN device identifiers;
code for receiving a signal from the executing application program, the signal indicating that the device information has been modified, the modified device information not including information related to the first SAN device identifier, and
code for deleting the first code module associated with the first SAN device identifier from the address spate of the executing program in response to the signal.

25. The computer program product of claim 24 wherein:
the device information before modification is stored in a set of files, each file including information related to a SAN device identifier from the set of SAN device identifiers and information related to a code module associated with the SAN device identifier, the set of files including a first file including information related to the first SAN device identifier and information identifying the first code module associated with the first SAN device identifier; and the modified device information is stored in a set of files not including the first file.

26. A computer program product stored on a computer readable medium for loading code modules, the computer program product comprising:

code for accessing information related to a first SAN device identifier, the information related to the first SAN Identifier including information identifying a first code module associated with the first SAN device identifier;

code for loading the first code module into an address space of an executing application program;

code for using the first code module to manage devices coupled to the SAN;

code for receiving a signal indicating that the information related to the first SAN device identifier has been modified, the modified information identifying a second code module associated with the first SAN device identifier instead of the first code module;

code for deleting the first code module associated with the first SAN device identifier from the address space of the executing application program in response to the signal;

code for loading the second code module into the address space of the executing application program; end code for using the second code module to manage devices coupled to the SAN.

27. The computer program product of claim 26 further comprising:

the code for using the first code module to manage the devices coupled to the SAN comprises:

code for scanning the SAN to identify at least a first device coupled to the SAN;

code for determining an identifier associated with the first device; and if the identifier associated with the first device matches the first SAN device identifier, code for using the first code module loaded into the address space of the executing application program to monitor the first device; and the code for using the second code module to manage the devices coupled to the SAN comprises;

if the identifier associated with the first device matches the first SAN device identifier:

code for instantiating an object using the second code module;

code for associating the object with the first device; and code for using the object to manage the first device.

28. The computer program product of claim 27 wherein the code for determining the identifier associated with the first device comprises code for using SNMP protocol to determine the identifier.

29. A computer program product stored on a computer readable medium for loading code modules, the computer program product comprising:

code for accessing device information comprising a set of SAN device identifiers including a first SAN device identifier, the device information further comprising information identifying code modules associated with each SAN device identifier in the set of SAN device identifiers including information identifying a first code module associated with the first SAN device identifier;

code for loading the code modules associated with the set of SAN device identifiers into an address space of an executing application program;

code for using the loaded code modules to manage a SAN;

code for receiving a signal indicating that the device information has been modified, the modified device information including a second SAN device identifier and a second code module associated with the second SAN device identifier, the second SAN device identifier not included in the set of SAN device identifiers included in the device information before modification;

code for loading the second code module into the address space of the executing application program in response to the signal; and code for using the loaded code modules corresponding to the set of SAN device identifiers and the second code module to manage the SAN.

30. The computer program product of claim 29 wherein the code for using the loaded code modules corresponding to the set of SAN device identifiers and the second code module to manage the SAN comprises:

code for scanning the SAN to identify a set of devices coupled to the SAN;

for each device in the set of devices:

code for determining an identifier associated with the device;

if the identifier associated with the device matches the first SAN device identifier, code for using the first code module loaded into the address space of the executing application program to monitor the device; and if the identifier associated with the device matches the second SAN device identifier, code for using the second code module loaded into the address space of the executing application program to monitor the device.

31. The computer program product of claim 30 wherein the code for using the second code module loaded into the address space of the executing application program to monitor the device comprises:

instantiating on object using the second code module;

associating the object with the device whose identifier matches the second SAN device identifier; and using the object to manage the device.

32. The computer program product of claim 30 wherein the code for determining the identifier associated with the device comprises code for using SNMP protocol to determine the identifier.

33. A computer program product stored on a computer readable medium for dynamically loading code modules, the computer program product comprising:

code for accessing information related to a SAN device identifier, the information related to the SAN identifier including information identifying a code module associated with the SAN device identifier;

code for loading the code module into an address space of an executing application program;

code for using the loaded code modules to manage devices in a SAN;

code for receiving a signal indicating that the code module has been modified;

code for deleting the previously loaded code module from the address space of the executing application program in response to the signal; and code for loading the modified code module into the address space of the executing application program.

34. A network system comprising:
a SAN network comprising at least one SAN device; and
a computer system coupled to the SAN network, the computer system comprising:
   a processor;
   a memory coupled to the processor, the memory configured to store a program for controlling the processor; and
the processor operative with the program to
access device information, the device information comprising information identifying a set of SAN device identifiers and a first set of code modules associated with the set of SAN device identifiers;
load the first set of code modules referenced by the device information into an address space of the program executed by the processor;
receive, while the program is executed by the processor, a signal indicating that the device information has been modified to produce modified device information;
in response to the signal:
   delete the first set of code modules referenced by the device information before modification from the address space of the program executed by the processor,
   access the modified device information; and
   load a second set of code modules referenced by the modified device information into the address space of the program executed by the processor.

35. A network system comprising:
a SAN network comprising a plurality of devices; and
a computer system coupled to the SAN network, the computer system comprising:
   a processor;
   a memory coupled to the processor, the memory configured to store a program for controlling the processor, and the processor operative with the program to
      access device information the device information including information related to a set of SAN device identifiers and information identifying a first set of code modules associated with the set of SAN device identifiers, the device information including information related to a first SAN device identifier and a first code module associated with the first SAN device identifier;
load the first set of code modules identified in the device information into an address space of the program executed by the processor;
use the first set of code modules to manage devices from the plurality of devices coupled to the SAN whose device identifiers match identifiers in the set of SAN device identifiers;
receive, while the program is executed by the processor, a signal indicating that the device information has been modified, the modified device information not including information related to the first SAN device identifier;
in response to the signal, delete the first code module associated with the first SAN device identifier from the address space of the program executed the processor.

36. The system of claim 35 wherein:
the device information before modification is stored in a set of files, each file including information related to a SAN device identifier from the set of SAN device identifiers and information related to a code module associated with the SAN device identifier, the set of files including a first file including information related to the first SAN device identifier and information identifying the first code module associated with the first SAN device identifier; and
the modified device information is stored in a set of flies not including the first file.

37. A network system comprising:
a SAN network comprising a plurality of devices; and
a computer system coupled to the SAN network, the computer system comprising:
   a processor;
   a memory coupled to the processor, the memory configured to store a program for controlling the processor; and
the processor operative with the program to
   access information related to a first SAN device identifier, the information related to the first SAN identifier including information identifying a first code module associated with the first SAN device identifier;
   load the first code module into an address space of the program executed by the processor;
   receive, while the program is executed by the processor, a signal indicating that the information related to the first SAN device identifier has been modified, the modified information identifying a second code module associated with the first SAN device identifier instead of the first code module; and
   in response to the signal:
      delete the first code module associated with the first SAN device identifier from the address space of the executing program; and
      load the second code module into the address space of the program executed by the processor.

38. The system of claim 37 wherein:
before receiving the signal, the processor is operative with the program to:
   scan the SAN to identify at least a first device coupled to the SAN;
   determine an identifier associated with the first device; and
   if the identifier associated with the first device matches the first SAN device identifier, use the first code module loaded into the address space of the program to monitor the first device; and
   after loading the second code module, the processor is operative with the program to use the second code module loaded into the address space of the program to monitor the first device if the identifier associated with the first device matches the first SAN device identifier.

39. The system of claim 38 wherein to use the second code module loaded into the address space of the program executed by the processor to monitor the first device, the processor is further operative with the program to:
   instantiate an object using the second code module;
   associate the object with the first device; and
   use the object to monitor the first device.

40. The system of claim 38 wherein in order to determine the identifier associated with the first device, the processor is further operative with the program to use SNMP protocol to determine the identifier.

41. A network system comprising:
a SAN network comprising a plurality of devices; and
a computer system coupled to the SAN network, the computer system comprising:

a processor;

a memory coupled to the processor, the memory configured to store a program for controlling the processor; and the processor operative with the program to
- access device information comprising a set of SAN device identifiers including a first SAN device identifier, the device information further comprising information identifying code modules associated with SAN device identifiers in the set of SAN device identifiers including information identifying a first code module associated with the first SAN device identifier;
- load the first set of code modules associated with the set of SAN device identifiers including the first code module into an address space of the program executed by the processor; and
- receive, while the program is executed by the processor, a signal indicating that the device information has been modified, the modified device information including a second SAN device identifier and a second code module associated with the second SAN device identifier, the second SAN device identifier not included in the set of SAN device identifiers included in the device information before modification;
- in response to the signal, load the second code module into the address space of the program executed by the processor.

42. The system of claim 41 wherein the processor is further operative with the program to:
- scan the SAN to identify a set of devices coupled to the SAN;
- for each device in the set of devices:
  - determine an identifier associated with the device;
  - if the identifier associated with the device matches the first SAN device identifier, use the first code module loaded into the address space of the program to monitor the device; and
  - if the identifier associated with the device matches the second SAN device identifier, use the second code module loaded into the address space of the program to monitor the device.

43. The system of claim 42 wherein in order to use the second code module loaded into the address space of the program to monitor the device, the processor is further operative with the program to:
- instantiate an object using the second code module;
- associate the object with the device whose identifier matches the second SAN device identifier; and
- use the object to monitor the device.

44. The system of claim 42 wherein in order to determine the identifier associated with the device, the processor is further operative with the program to use SNMP protocol to determine the identifier.

45. The system of claim 41 wherein the device information is stored in a plurality of files, each file including information related to a SAN device identifier from the set of SAN device identifiers and information related to a code module from the first set of code modules associated with the SAN device identifier.

46. A network system comprising:
- a SAN network comprising a plurality of devices; and
- a computer system coupled to the SAN network, the computer system comprising:
  - a processor;
  - a memory coupled to the processor, the memory configured to store a program for controlling the processor; and
  - the processor operative the program to
    - access information related to a SAN device identifier, the information related to the SAN identifier including information identifying a code module associated with the SAN device identifier;
    - load the code module into an address space of the program executed by the processor;
    - receive, while the program is executed by the processor, a signal indicating that the code module has been modified;
    - in response to the signal:
      - delete the previously loaded code module from the address space of the executing program; and
      - load the modified code module into the address space of the executing program.

* * * * *